United States Patent [19]

Wubbe

[11] 3,866,262

[45] Feb. 18, 1975

[54] WINDSHIELD WIPER BLADE

[75] Inventor: Leo J. Wubbe, Beverly Shores, Ind.

[73] Assignee: The Anderson Company, Gary, Ind.

[22] Filed: Oct. 16, 1973

[21] Appl. No.: 406,808

[52] U.S. Cl. .......................................... 15/250.42
[51] Int. Cl. ............................................. B60s 1/38
[58] Field of Search ....... 15/250.35, 250.36, 250.38, 15/250.42

[56] References Cited
UNITED STATES PATENTS

| | | | |
|---|---|---|---|
| 2,955,313 | 10/1960 | Anderson | 15/250.42 |
| 3,094,734 | 6/1963 | Hoyler | 15/250.42 |
| 3,629,898 | 12/1971 | Plisky | 15/250.42 |
| 3,643,286 | 2/1972 | Wubbe | 15/250.42 |
| 3,772,730 | 11/1973 | Plisky | 15/250.42 |

FOREIGN PATENTS OR APPLICATIONS 935,460 8/1963 Great Britain ................ 15/250.42

Primary Examiner—Peter Feldman
Attorney, Agent, or Firm—Wegner, Stellman, McCord, Wiles & Wood

[57] ABSTRACT

A wiper blade is provided with a resilient wiping member pretensioned in a flexible backing strip to which is connected a superstructure for applying pressure from a wiper arm to a plurlity of points on said backing strip to urge said wiping member into wiping contact with a windshield throughout the length of said wiping member. The resilient wiping member has a pair of spaced apart abutments positioned to be engaged by the inboard claws of a pair of secondary yokes of the superstructure for urging the secondary yokes outboard into engaging relation with the end portions or claws of a primary yoke of the superstructure. To assemble or disassemble the primary yoke from the secondary yokes, the secondary yokes (or at least one secondary yoke) are urged inward until one end portion or pair of claws of the primary yoke is moved outboard of its associated secondary yoke and into alignment with an entry portion of the secondary yoke whereupon the primary yoke is moved transverse to the secondary yoke to disconnect said primary and secondary yokes whereupon the superstructure is disassembled from the blade.

14 Claims, 14 Drawing Figures

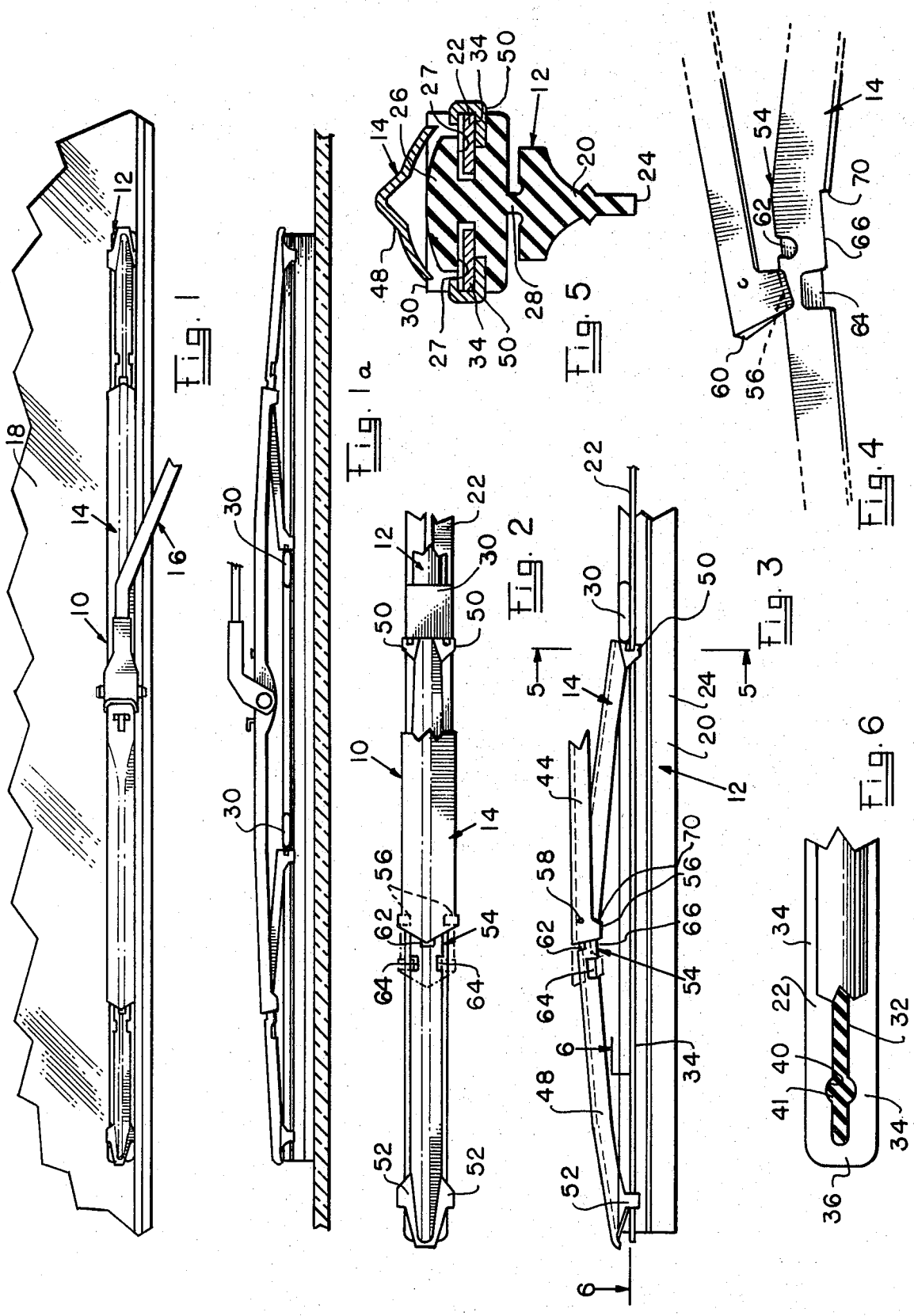

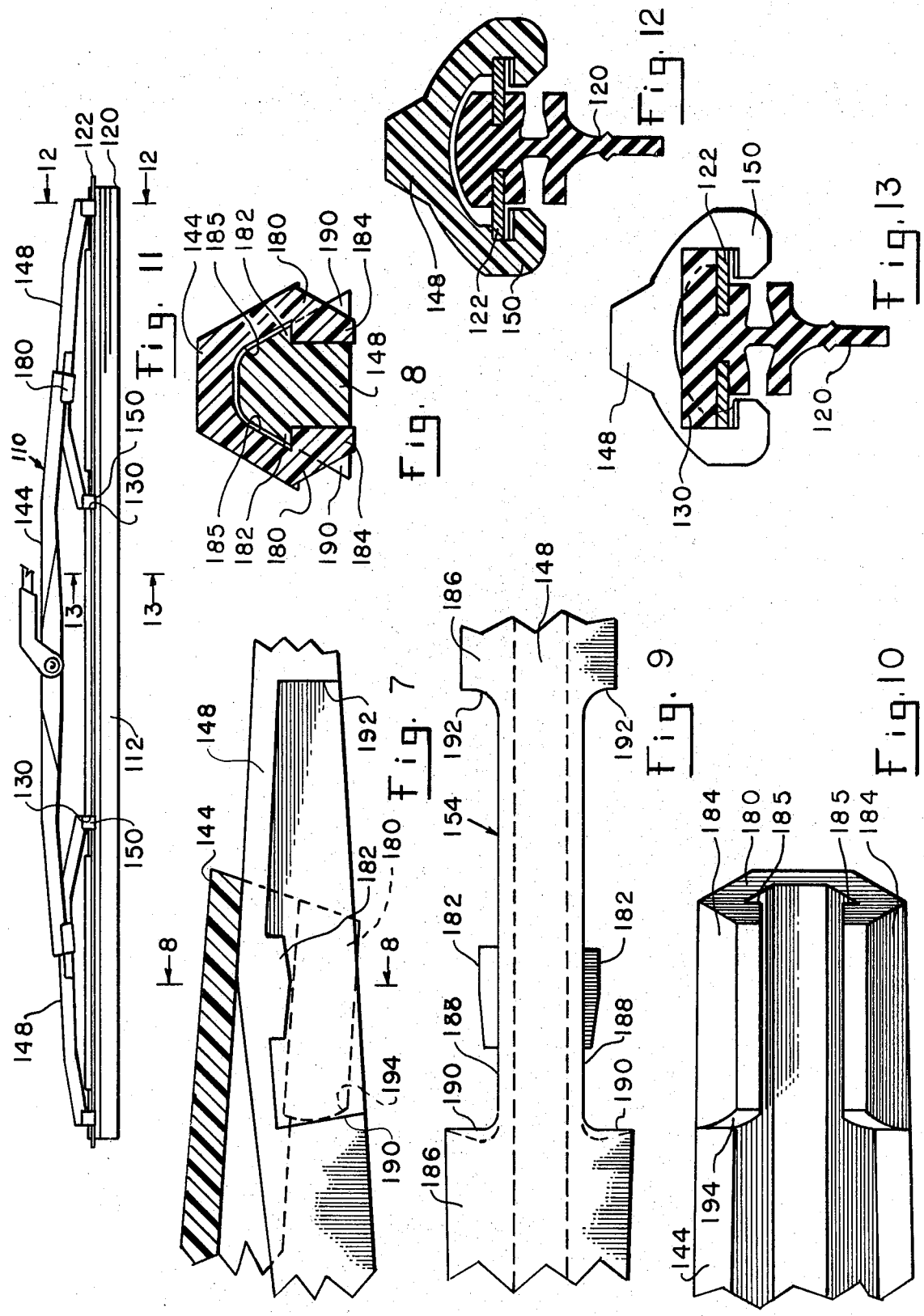

WINDSHIELD WIPER BLADE

BACKGROUND OF THE INVENTION

1. Field of The Invention

This invention relates to windshield wiper blade assembles and more particularly to a construction whereby a primary yoke of a pressure distributing superstructure of the blade is quickly and efficiently connected to a secondary yoke and a wiper blade element without mechhanical latching members therebetween.

2. Description of the Prior Art

In the 1940's John W. Anderson invented a windshield wiper blade for wiping effectively, for the first time, both curved and flat windshields. U.S. Pat. No. 2,596,063 was issued covering the invention which comprised a pressure distributing superstructure slidably mounted on a wiper blade element whereby pressure from a wiper arm would be transmitted through the superstructure to a plurality of points along a backing strip of the wiper blade element for conforming a resilient wiping member to the surface being wiped. The superstructure found most satisfactory in use is the triple yoke structure having a primary yoke pivotally connected to a pair of secondary yokes which in turn are slidably connected on the backing strip of the wiper blade element.

To assemble and disassemble the superstructure from the wiper element so that the wiper blade element can be replaced, many different modifications have been proposed. One such proposal entailed using end clips on the wiper blade element which would prevent the superstructure from being removed from the wiper blade element but at the same time said clips could be removed or manipulated so that the superstructure could be slid off and a new wiper blade element inserted in its place.

Another well known and highly successful structure for assembling and disassembling the superstructure from the wiper blade element is shown in U.S. Pat. No. 2,879,530 wherein a spring and actuator arrangement are provided on a secondary yoke for use in latching and unlatching the end of a primary yoke to said secondary yoke. Although the latching arrangement of U.S. Pat. No. 2,897,530 is practical and still is extensively used, there is an extra cost added to the blade to provide the operative elements of the latch to the superstructure.

One attempt has been made to reduce the cost of adding the latching arrangement to the blade by eliminating the latching arrangement. The structure eliminating the latch is shown in U.S. Pat. No. 3,414,931 wherein the ends of the secondary yokes are tapered in width from the center outward and the claws at the ends of the primary yoke are of such a size that they will drop past the reduced width of the secondary yokes and when moved toward the center of the secondary yoke will engage under the wider center portion of the secondary yoke and rest against an abutment in the secondary yoke. To prevent the secondary yokes from sliding off the wiping blade element, the ends of the secondary yokes are turned down to engage the ends of the wiping blade element. As an alternative, the abutments of the secondary yokes are reversed in direction and the backing strip of the wiping blade element has upturned ends to prevent the secondary yokes from sliding off the wiping blade element.

The structure of U.S. Pat. No. 3,414,931 has many deficiencies such as the requirement that the ends of the secondary yokes be bent down or that the flexor must be bent up to prevent separation of the superstructure from the blade. In addition, since there are no forces holding the primary yoke assembled with the secondary yokes, the two become easily separated in shipment, in storage and in assembling on a vehicle.

SUMMARY OF THE INVENTION

To overcome the problems inherent in some of the prior attempts to provide a simple, quick, inexpensive, yet reliable structure for connecting and disconnecting the superstructure of a windshield wiper blade from the wiper blade element, a prestressed resilient wiping member or squeegee is provided with a pair of spaced apart abutments on an enlarged head portion of said wiping member. The inboard claws of secondary yokes abut against said abutments when the claws of said secondary yokes are in engagement with the side edges of a backing strip of said wiping blade element. The end portions of the primary yoke pass downwardly through reduced dimensioned outboard entry portions of the secondary yokes and are urged inward against stops in the secondary yokes by the outward forces of the abutments on the wiping member against the inboard claws of the secondary yokes. The claws on the end portions of primary yoke engage beneath projecting portions of the secondary yokes and permit the secondary yokes to pivot relative to the primary yoke as the wiper blade moves over the variously curved portions of a windshield.

Due to the outward forces of the abutments on the wiping member urging the stops on the secondary yokes against the claws on the primary yoke, the superstructure of the blade is held positively assembled with the wiper blade element so that the superstructure does not become disassembled from the wiper blade element accidentally during handling, shipment or assembly with the wiper arm of a vehicle. Even with the positive forces holding the blade assembled, it is a relatively simple matter to disconnect the primary yoke from a secondary yoke by pressing the secondary yokes inwardly until the claws on the primary yoke align with the reduced dimensioned portion of the secondary yoke whereupon moving the claws transverse to the secondary yoke separates the two and permits the superstructure to be removed from the wiper blade element.

In a modified form of the invention, sidewardly projecting lugs in the intermediate portion of the secondary yokes are engaged in claws formed on the interior facing surfaces of the end portions of the primary yoke with the inboard edges of said claws engaging stops on said secondary yokes. The lugs and claws permit the primary and secondary yokes to pivot relative to each other and at the same time movement, of the primary yoke relative to the secondary yoke outboard along the elongate axis of the yokes in the direction away from the stop on the secondary yoke will permit the yokes to be separated for disassembly of the superstructure from the wiper blade element.

BRIEF DESCRIPTION OF THE DRAWINGS

The details of construction and operation of the invention are more fully described with reference to the accompanying drawings which form a part hereof and

3 in which like reference numerals refer to like parts throughout.

In the drawings:

FIG. 1 is a top view of a windshield wiper blade assembly in the park position on a windshield adjacent the lower edge of said windshield;

FIG. 1A is an elevational view of a triple yoke superstructure and wiper blade element assembled together;

FIG. 2 is an enlarged partial top view of one end portion of the windshield wiper blade assembly of FIG. 1;

FIG. 3 is a side view of that portion of the windshield wiper blade assembly of FIG. 2 showing the end portion of the primary yoke assembled with the secondary yoke;

FIG. 4 is a side view of a portion of the assembly of FIG. 3 with the connecting portion of the primary yoke disassembled from the secondary yoke;

FIG. 5 is cross-sectional view taken along the line 5—5 of FIG. 3;

FIG. 6 is a cross-sectional view taken along the line 6—6 of FIG. 3;

FIG. 7 is a partial side view of a modified form of connection between the end portion of the primary yoke and the intermediate portion of a secondary yoke;

FIG. 8 is cross-sectional view taken along the line 8—8 of FIG. 7;

FIG. 9 is a top view of the intermediate portion of the secondary yoke of FIG. 7;

FIG. 10 is a partial bottom view of the end portion of the primary yoke of FIG. 7;

FIG. 11 is a side elevational view of a windshield wiper blade incorporating the features of FIGS. 7—9.

FIG. 12 is a cross-sectional view taken on the ling 12—12 of FIG. 11; and,

FIG. 13 is a cross-sectional view taken on the line 13—13 of FIG. 11.

DESCRIPTION OF THE PREFERRED EMBODIMENT

The windshield wiper blade assembly 10 shown in FIGS. 1-6 comprises a wiper blade element 12 and an articulated pressure distributing superstructure 14 which receives pressure from a wiper arm 16. The pressure from the wiper arm 16 is transmitted through the elements of the superstructure to the wiper blade element 12 for conforming a resilient wiping member 20 of the wiper blade element 12 to the surface of the windshield 18 whereby movement of the arm 16 and blade 10 across the surface of the windshield will wipe the desired area of the windshield.

The wiper blade element 12 is comprised of the resilient wiping member or squeegee 20 and the flexible support member or flexor 22. The resilient wiping member 20 has a wiping edge 24 and an enlarged head portion 26 joined together by a hinge 28. The head portion 26 has a pair of mating grooves 27 formed in the opposite sides thereof. A pair of upwardly and sidewardly projecting abutments 30 are formed on the head portion 26 of the wiping member 20 in axially spaced apart relationship inboard from the respective end portions thereof. The flexible support member or flexor 22 is an elongate planar member of appropriate metal or plastic material and is flexible in a direction perpendicular to the planar portion of the member 22 and is relatively inflexible in a plane transverse thereto. The support member or flexor 22 has a long narrow aperture or slot 32 centrally disposed therethrough and extending slightly less than the full length of the member thus forming two laterally spaced apart side rails or portions 34 joined at both ends by end portions 36.

The side rails or portions 34 of the support member or flexor 22 are placed in the grooves 27 in the head portion 26 of the wiping member 20. As shown and described in U.S. Pat. No. 3,643,286, issued in the name of Leo J. Wubbe on Feb. 22, 1972 and assigned to the common assignee of the present application, the wiping member 20 is pretensioned by having adjacent each end of the side rails 34 a pair oppositely positioned recesses, indentations, notches or keyways 40 formed in the sides of the slot 32. The bottom of the grooves 27 in the resilient wiping member 20 have, adjacent the ends thereof, oppositely positioned detents, projections, protuberances or keys 41 which are engaged in and mate with keyways 40 in interlocking relationship.

The flexor 22 is assembled with the resilient wiping member 20 under longitudinal tension and the latter is maintained under longitudinal tension. This is achieved by spacing the pairs of keyways 40 slightly further apart than the distance between the pairs of keys 41 on the resilient wiping member. Blade element 12 is assembled by placing the side rails 34 of flexor 22 in the grooves 27 and exerting longitudinal tension on the wiping member 20 so that keyways 40 and keys 41 engage. Thereafter, keyways 40 and keys 41 form a means of interlocking the resilient wiper member 20 and the flexor 22 so that the resilient wiping member 20 and hence the wiper edge 24 remain under longitudinal tension.

The pressure distributing superstructure 14 comprises a primary pressure distributing yoke or bridge 44 which is connected at its end portions 46 to secondary pressure distributing yokes or bridges 48. The secondary yokes 48 have two pairs of inwardly projecting claws 50, 52 formed on the inboard and outboard end portions thereof, respectively, which claws 50, 52 are designed to slidably engage with the exposed edge portions of said support member or flexor 22 at spaced apart locations thereon. The inboard claws 50 on each secondary yoke are positioned in juxtaposed relationship to one abutment 30 with the outboard claws 52 slidably engaging with the end portions of the support member or flexor 22. The inboard claws 50 are shown in FIGS. 3 and 5 as having a portion generally conforming to the shape of the side rails 34 thereby reducing relative movement between the two in a direction transverse to the flat portion of the flexor and more accurately aligning the abutting surface of the end of the claw of the secondary yoke with the abutment 30 on the wiping member 20.

Each secondary yoke 48 has an intermediate portion 54 to which one end portion of the primary yoke 44 is removably attached for articulated movement of said primary yoke 44 relative to said secondary yoke 48. Each end portion of said primary yoke 44 is shaped in cross-section to conform generally to the crosssectional shape of the underlying secondary yoke and has inwardly projecting claws 56. A pair of embossements 58 are formed in the opposite sides of said end portion of the primary yoke to form contact points for engagement with the overlaid portion of the secondary yoke to improve the nature of the contact between the two yokes as described in U.S. Pat. No. 3,629,898 to J.

Plisky and assigned to the common assignee of the present application.

The inner edge surface of the end of the primary yoke 44 has a slight burr or projection 60 extending into the open area of the primary yoke 44. The burr 60 projects into a recess 62 formed in the underlying top surface of the secondary yokes 48 to prevent interference between the end of the primary yoke and the secondary yoke during movement of one relative to the other, all as shown and described in the copending application Ser. No. 257,096 now U.S. Pat. No. 3,772,730, of J. Plisky assigned to the common assignee of the present application.

Each secondary yoke 48 has the intermediate portion 54 located between the ends thereof and which portion 54 can be centrally disposed with respect to said ends or can be off center with respect to said ends. When the connecting portion is off center with respect to said ends the secondary yoke is considered unsymmetrical and affords a slightly different distribution of pressure to the ends of said secondary yoke. Whether the portion 54 of the secondary yoke is centrally or non-centrally located forms no part of this invention and both forms are considered within the context of this disclosure.

The intermediate portion 54 of each secondary yoke 48 has a mating pair of indentations or recesses 64 formed in the opposite sides thereof to form a reduced dimensioned access opening between the top and the bottom of said secondary yoke. Inboard of said indentations or recesses 64, said intermediate portion 54 of the yoke 48 has the overhanging edge portions or projections 66 terminated by the protruding portions or stops 68 to form abutting surfaces 70.

With the claws 50, 52 of both secondary yokes 48 threaded onto the end portions of the flexor 22 with the inboard claws of both secondary yokes abutting the abutments 30, the primary yoke 44 is assembled with the secondary yokes 48 by first aligning the claws 56 on one end portion of the primary yoke with the indentations or recesses 64 in the intermediate portion 54 of one secondary yoke and dropping said claws through said indentations 64 and moving the claws beneath the overhanging portions or projections 66 and into contact with the abutting surface 70. The primary yoke 44 and connected secondary yoke 48 is now pulled toward the other secondary yoke 48 at the time the other secondary yoke 48 is urged toward said connected secondary yoke. The combined pulling of the one secondary yoke and pushing of the other secondary yoke acts against the spaced abutments 30 to compress the wiping member 20 between the abutments 30 to decrease the distance between the connecting portions 54 of the secondary yokes 48 until the claws on the unconnected end of the primary yoke 44 aligns with the indentations or recesses 64 whereupon the claws are dropped down through the opening between the recesses. Release of one of the secondary yokes permits the wiping member 20 to expand so that the abutments 30 will move the secondary yokes apart and move the claws 56 on both ends of the primary yoke 44 into position below the overhanging portions 66 and against the abutting surfaces 70 in the secondary yokes.

The distance between the abutting surfaces of the abutments 30 plus twice the distance between one abutting edge of the claw 50 on one secondary yoke and the abutting edge 70 of the intermediate portion 54 of said secondary yoke 48 should be slightly greater than or equal to the distance between the inboard abutting edges of the claws 56 of the primary yoke 44 so that the resilience of the wiper 20 will urge the secondary yokes into nested relationship with the primary yoke. The pretensioning of the wiping member 20 by the keys 41 and keyways 40 contribute to the outward urging by the abutments 30 against the secondary yokes 48.

In practice, it has been found that due to the preloading of the secondary yokes outwardly against the claws 56 of the primary yoke prevents the yokes from becoming accidentally disassembled from each other or from the wiper blade element 20. During storage, shipment, rough handling and installation on a wiper arm on a vehicle, the wiper blade assembly remains in tact and ready for use, thus eliminating the falling apart in the carton or in the hand while installing on a vehicle of previous non-positively latched superstructures. The wiper blade assembly has the advantage of being cheaper and simpler to build and install while having the additional advantage of being quicker to disassemble and reassemble for replacing worn wiper blade elements 12.

In a modified form of the invention as shown in FIGS. 7-13, a primary yoke 144 made of a plastic material is connected to a pair of secondary yokes 148 also made of plastic material by means of a pair of claws 180 on each end of the primary yoke 144 engaging with pairs of oppositely projecting lugs 182 formed in the intermediate portions 154 of the secondary yokes 148.

Specifically, each end of the primary yoke 144 has the pair of claws 180 formed by downwardly depending, inwardly converging, spaced apart side walls 184. On the inside surfaces of the side walls 184 are formed a pair of aligned slots 185 open at each end.

Each side of each secondary yoke 148 has an elongate lateral edge portion 186 cut in at an intermediate portion 154 thereof to form a pair of spaced apart parallel side walls 188 having the oppositely and outwardly projecting lugs 182 formed thereon. The side walls 188 of the intermediate portion are bounded on each end by projecting portions to form abutments 190, 192 inboard and outboard, respectively, thereof. Abutments 190 are spaced from the lugs 182 an amount somewhat less than the axial length of the claws 180 of the premary yoke 144. The abutments 192 are spaced from the lugs 182 an amount equal to a little more than the axial length of the claws 180 of the primary yoke 144 to form an entry opening so that the claws 180 can span the distance between the side walls 188 of the secondary yoke and drop between the lugs 182 and the abutments 192 until the slots 185 in the claws align with the lugs 182 whereupon the primary yoke 144 is moved axially inward toward and into pivoting relation with the lugs 182 on the secondary yoke 148. The edges 194 of the side walls 184 of the claws 180 of the primary yoke 144 have an arcuate shape so that as the primary yoke 144 is articulated about the lugs 182, each edge 194 on the primay yoke will have substantially a line contact with abutment 194 as the primary and secondary yokes pivot relative to each other.

As in the form of invention described with respect to FIGS. 1-6, the wiper blade assembly 110 of FIGS. 7-13 has a wiper blade element 112 with a resilient wiping member or squeegee 120 having a flexible support member or flexor 122. The resilient wiping member 120 has abutments 130 formed centrally thereof against which the inboard claws 150 of the secondary yokes 148 abut. The claws 180 on one end of the primary yoke 144 are manipulated, as described above, with the side walls 184 bridging the reduced dimensioned entry portion of one secondary yoke 148 and when the slots 185 are aligned with the lugs 182 it is moved inboard to engage the lugs 182 into articulating relation with the slots 185 in the claws of the primary yoke. The secondary yokes 148 are both urged toward the middle of the wiper blade element 112 to compress the central portion of the resilient wiping member between the abutments 130 until the claws 180 on the other end of the primary yoke 144 aligns with the entry opening between the lugs 182 and the abutments 192 on the other secondary yoke 148 whereupon the claws 180 are dropped down through the entry opening and the slots 185 are aligned with the lugs 182. The inboard pressure on the secondary yokes 148 is now released and the resilience of the rubber element 120 urges the secondary yokes into assembled relation with the ends of the primary yoke ready for use in wiping a windshield.

The distance between the outboard edges of the abutments 130 plus the distances between the contact of the inboard claws of the secondary yokes with the abutments 130 and the abutments 190 of each of the secondary yokes should be just about equal or be slightly less than the distance between the abutting edges 194 of the claws 180 of the primary yoke when the resilient wiping element 112 is in a substantially straight condition. In that way, the claws at the ends of the primary yoke cannot readily or accidentally become disengaged from the secondary yokes. To disassemble the superstructure from a wiper blade element requires positive manipulation of the parts to compress a portion of the resilient wiping member so that the primary yoke can be disassembled from one secondary yoke thereby permitting rapid disassembly and replacement of the wiper blade element 112.

I claim:

1. A wiper for cleaning a windshield comprising a pressure-distributing superstructure operatively connected to a flexible backing strip carried by a resilient wiping member, a pair of abutments carried by said wiping member and positioned in spaced apart relationship thereon, said superstructure having a pair of secondary yokes and a primary yoke, each of said secondary yokes having means slidably engaging with one end portion of said backing strip outboard of the abutments, at least one of said secondary yokes having aligned indented portions formed intermediate the ends thereof, sidwardly projecting means formed inboard of said indented portions, stop means carried by said secondary yoke inboard of said projecting means, said primary yoke being pivotally connected to one said secondary yokes and having means on the other end portion which pass through said indented portion and pivotally engage with said projecting means and abut against said stop means, said abutments on said wiping blade urging said secondary yokes outboard relative to said primary yoke to hold the means on said primary yoke assembled with the projecting means on said secondary yoke whereby the superstructure is held assembled on the blade.

2. The wiper as claimed in claim 1 wherein said sidewardly extending means is a pair of overhanging edge portions of said secondary yoke and said stop means is a projection formed at the inboard end of one said edge portions.

3. The wiper as claimed in claim 1 wherein said primary and secondary yokes are of plastic material and said sidewardly extending means is a pair of lugs formed on said secondary yoke and said stop means is a projection formed inboard of said indented portions.

4. The wiper as claimed in claim 3 wherein said means on said primary yoke is a pair of spaced apart downwardly and inwardly extending side walls defining mating slots on the inside thereof and being adapted to pivotally engage with said lugs.

5. The wiper as claimed in claim 4 wherein each secondary yoke has indented portions, projecting means and stop means wherein said primary yoke has means on each end portion for passing through the indented portions and pivotally engaging the projecting means as the inboard edges of said last named means engages the stop means on each secondary yoke.

6. The wiper as claimed in claim 5 wherein said resilient wiping member is retained under tension in said flexible backing strip for maintaining outboard pressure applied by said abutment means on said wiping member against the secondary yokes and in turn against the primary yoke.

7. A wiper for cleaning windshield comprising an elongate wiper blade element and a pressure-distributing superstructure operatively connected thereto, said wiper element having a resilient wiping member and a flexible backing strip operatively associated therewith, said backing strip being carried by said wiping member and loading said wiping member in tension, a pair of upwardly and sidewardly projecting abutments on said wiping member and positioned in axially spaced apart relationship thereon, said superstructure having a pair of secondary yokes and a primary yoke, each of said secondary yokes having inturned claws on the opposite end portions thereof with said claws slidably engaging the outer edges of the backing strip outboard of one of said abutments, one end portion of said primary yoke being pivotally connected to an intermediate portion of one of said secondary yokes, the other end portion of said primary yoke having a pair of inturned claws spaced apart from each other, said other secondary yoke having aligned indented portions thereon, said indented portions being laterally spaced apart an amount sufficient to permit the inturned claws on the primary yoke to pass therethrough, means on said other secondary yoke engaging within the confines of said inturned claws on said primary yoke when said claws are moved from said indented portions toward the center of the blade, and stop means adjacent said last named means for engaging the claws on the primary yoke as said abutments on said wiping blade urge said secondary yokes outboard relative to said primary yoke to hold superstructure assembled on said blade.

8. The wiper of claim 7 wherein the ends of said primary yoke have downturned protrusions which extend into a recess formed in the upper surface of underlying secondary yoke so that the primary and secondary yokes can pivot freely relative to each other.

9. A wiper for cleaning a windshield comprising a pressure-distributing superstructure, a wiper blade element having a resilient wiping member, a flexible backing strip operatively associated with said wiping member, a pair of spaced apart abutments carried by said wiping member, said superstructure having a primary yoke and a pair of secondary yokes, said secondary yokes having claw means on the end portions thereof slidably engaging with the backing strip outboard of said abutments, one end portion of said primary yoke having a pair of inturned means spaced apart from each other, at least one secondary yoke having an entry portion intermediate the ends thereof and through which entry portion the inturned means on the primary yoke pass, means inboard of said entry portion and projecting outwardly from the sides of said secondary yoke in position to be pivotally engaged by the inturned means of said primary yoke as said inturned means are moved inboard from the entry portion, stop means inboard of said outwardly projecting means engaged by said inturned means of said primary yoke as the inboard claw means on said secondary yokes are urged in an outboard direction by said abutment means on said wiping member.

10. A wiper for cleaning a windshield comprising a pressure-distributing superstructure, a resilient wiping member, a flexible backing strip operatively associated with said wiping member, a pair of spaced apart abutments carried by said wiping member, said superstructure having a primary yoke and a pair of secondary yokes, said secondary yokes having means on the end portions thereof slidably engaging with the backing strip outboard of said abutments, said primary yoke having inturned means on each end portion thereof, each secondary yoke having an entry portion intermediate the ends thereof, means projecting from said intermediate portion of said secondary yoke inboard of said entry portion, said inturned means of said primary yoke pivotally engaging with said projecting means, stop means on said secondary yoke inboard of said projecting means and engaged by said inturned means of said primary yoke as the inboard claw means on said secondary yokes are urged in an outboard direction by said abutment means on said wiping member for holding said superstructure firmly on said wiping member and backing strip.

11. The wiper of claim 10 wherein said projecting means on said secondary yoke is a pair of overhanging edge portions and said stop means is a projection located adjacent the inboard end of each of said edge portions.

12. The wiper of claim 10 wherein said primary and secondary yokes are of plastic material and said projecting means is a pair of lugs formed on said secondary yoke.

13. The wiper of claim 11 or 12 wherein said resilient wiping member is mounted in said flexible backing strip in tension whereby said abutments on said wiping member are more firmly resistant to inward pressure by said secondary yokes assembled with said primary yoke.

14. The wiper as claimed in claim 10 wherein said inturned means on said primary yoke are moved outboard relative to said projecting means against the resilience of said wiping member and into alignment with said entry portion whereby the primary yoke can be separated from the secondary yoke for disassembly of the superstructure from the blade.

* * * * *